April 5, 1949.

G. L. BAKER 2,466,146

EDIBLE GELLING COMPOSITION CONTAINING
IRISH MOSS EXTRACT, LOCUST BEAN
GUM AND AN EDIBLE SALT
Filed April 12, 1947

INVENTOR.
George L. Baker
By Walter M. Fuller
atty.

Patented Apr. 5, 1949

2,466,146

UNITED STATES PATENT OFFICE 2,466,146

EDIBLE GELLING COMPOSITION CONTAINING IRISH MOSS EXTRACT, LOCUST BEAN GUM, AND AN EDIBLE SALT

George L. Baker, Newark, Del., assignor to Krim-Ko Corporation, Chicago, Ill., a corporation of Illinois Application April 12, 1947, Serial No. 741,116

4 Claims. (Cl. 99—131)

The present invention pertains to the art of preparing elastic gels and refers particularly to the preparation of novel gelling compositions substantially derived from the sea-plant Irish moss.

Figure 1:
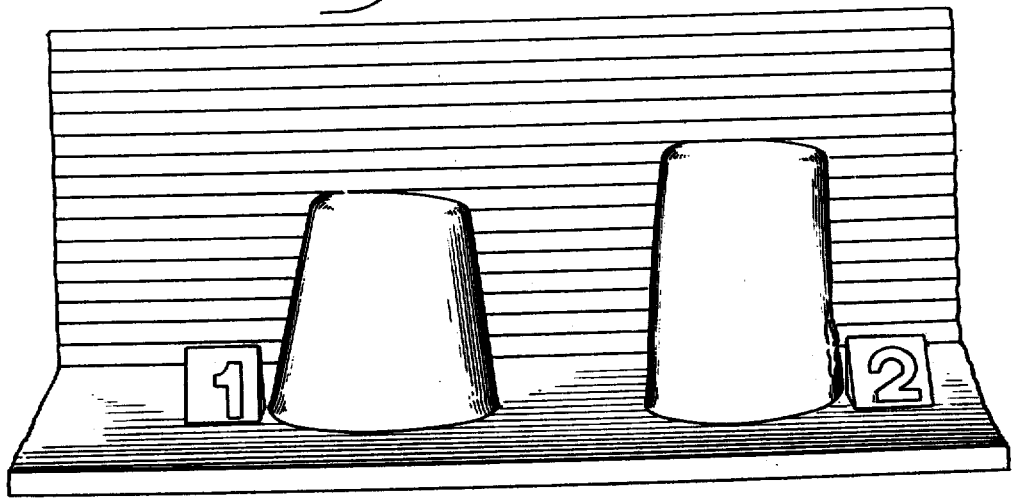
Figure 2:
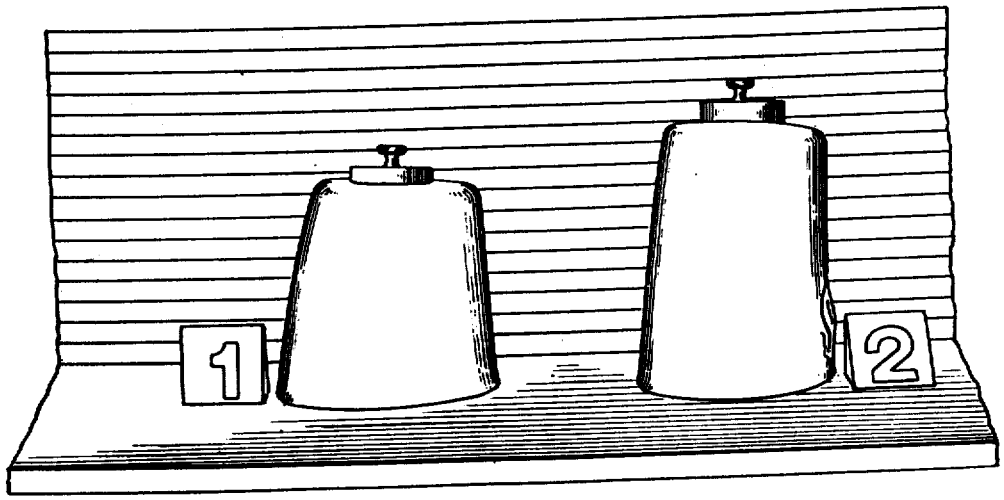

In the accompanying drawing, made from photographs, forming a part of this specification and to which reference should be had in connection therewith, Figure 1 illustrates two gels made from different compositions, one incorporating the present invention and the other a different composition; and in Figure 2 the same gels are illustrated with like weights resting on their tops.

A potentially useful and hitherto relatively neglected gelling agent is gelose, or carragheenin, the active colloidal substance contained in Irish moss or *Chondrus crispus*, a member of the Gigartinaceae.

Although widely known for many years it has heretofore been regarded principally as a thickening substance or stabilizing agent. Various expedients have been suggested for improving the physical properties, particularly the gel-forming capacity of Irish moss extractive. One such suggested expedient is to implement the gelatinizing action through the action of certain ions, notably potassium, which have been shown to induce gel formation.

The added cations are only effective up to the point of complete neutralization of the negative or anionic charge carried by the carragheenin sol particles. At this point carragheenin manifests the normal full potential in gelatinizing power. Anything less than this is subnormal performance. Anything more than this would be thought to increase the gelling power, but this is not the case. Potassium and similar cations, therefore, merely bring about the degree of gelatinization of which the colloid is already inherently capable; they do not increase the gelling power.

Apart from this technical distinction, there is the further very practical observation that even the best cation-induced Irish moss gels lack elasticity comparable to pectin gels. The yielding, non-cohesive, and essentially brittle character of the Irish moss gel is not altered in any important particular by the gel-inducing ions. Elastic, strong, form-retaining gels such as those needed by the manufacturing confectioner for slab or cutting operations have not been obtainable in the past with Irish moss.

An outstanding object of this invention is to prepare gelling compositions substantially composed of Irish moss gelose which can be used in lieu of animal gelatine or fruit or vegetable pectinates. A particular objective of the invention is to prepare an Irish moss gelose product which will produce elastic, strong, and form-retaining gels suitable for food purposes, i. e. salads and desserts, over a wide range of soluble solids content. This invention has led to the discovery of a three-element gelling composition functioning in a superior manner to known compositions in the gelling field. This novel composition produces Irish moss gels of desired elasticity, strength and form-retention greatly in excess of the additive effects predictable from the performance of the several component elements when used alone or in pairs.

In its simplest form the new composition comprises (1) a source of gelose or carragheenin particles whose surface charges may be neutralized by suitable cations to permit maximum absorption of water medium; (2) a colloid substance of high natural viscosity and neutral reaction whose degree of polymerization and water absorption are substantially unaffected by heat; and (3) a source of neutralizing cations.

For the gelose element it is preferred to take the refined aqueous whole extract of the Irish moss plant, although it is known that alcohol-precipitated or selectively-extracted Irish moss fractions, agar-agar, and various other sources of active gelose principle may be employed. When the normal negative charge on the colloidal particles of the Irish moss sol is sufficiently neutralized by the appropriate cations, imbibition of the dispersing medium is rapid, predisposing the system to gel formation.

For the neutral high polymer or colloidal addition-agent locust bean gum has been found to be eminently satisfactory, but the invention is not limited to this substance inasmuch as a number of other neutral high polymers will also meet the above-stated qualifications in various degrees. Starch and carboxymethylcellulose compounds are in this category and while not nearly as valuable as locust bean gum in developing elasticity and form-retention, the two most desired physical characteristics, they do exhibit a capacity to aid in expanding the normal gelling strength of the gelose. The relative value of the naturally high polymers in increasing gel strength of moss gelose is shown by the following comparative figures upon sugar gels containing 40% soluble solids which were made by similar procedure at pH 3.5:

Control, 0.6% Irish moss gelose extract plus 0.2%:
KCl ---------------------------------- 10
High polymers added to control gel:
   0.4% locust bean gum ---------------- 83
   0.4% high viscosity sodium
      carboxymethyl-cellulose ------------ 25
   1.0% corn starch --------------------- 24
   0.4% gum karaya --------------------- 19
   0.4% gum tragacanth ----------------- 14
   0.4% potassium carboxymethylcellulose - 12
   0.4% low viscosity sodium carboxyl-
      methylcellulose ---------------------- 12
   0.4% gum arabic --------------------- 12
   0.4% guar flour --------------------- 11

While members of the above group aid in increasing the strength of gelose gels, none, other than locust bean gum, imparts the desired degree of elasticity and form-retention.

For the source of the gel-inducing ion potassium chloride, which is commercially available in pure form and quite cheap, may be used. Where greater resistance to acidic conditions is required the potassium ion may be employed in combination with the anion component of a relatively weak organic acid, exemplary of which are acetic, citric, lactic, malic, and tartaric acids. These provide a relatively strong buffer reaction and help to reduce the aggressive hydrolytic action manifested by acids on the gelose factor, especially in the presence of substantial heat, but tend to reduce gel strength. Potassium citrate gels were found to have about two-thirds the strength of potassium chloride gels of equivalent potassium content at similar pH values. While potassium salts are preferred, salts of calcium, magnesium, and a number of other cations will function with varying degrees of effectiveness.

By bringing the aforementioned three elements, gelose-high polymer-cation together in a common gel system a number of surprising effects is obtained, the most remarkable of which is the substantial increase in the elasticity of the gelose gels. Gel-strength and form-retention are also greatly improved. The betterments in these characteristics are of a magnitude greater than can be accounted for by the additive effects of the components acting independently of each other and can only be explained on the hypothesis that a multiple synergy or expansion of gelling capacity has been established by the three elements acting in unison.

For example, it is easily demonstrated that locust bean gum is devoid of gel-forming capacity in the concentrations employed. A 0.4% solution has a viscosity of 75 centipoises at pH 5.15 at 26° C. Potassium salt decreases rather than increases the viscosity and the probability of gelation; 0.25% potassium chloride reducing the viscosity to 62 centipoises at pH 5.00. While a 1% solution is much more viscous, it does not gel even with sugar. A 1% solution of locust bean gum, two and one-half times the preferred concentration, containing 40% cane sugar, does not gel even at 4.4° C., but is very viscous. It has a viscosity of 6700 centipoises at 26° C. and pH 5.22. Decreasing the temperature to 4.4° C., the viscosity is increased to 8000 centipoises. Again, potassium salts decrease viscosity; 0.2% potassium chloride decreases the viscosity to 6600 centipoises at 26° C., 0.4% potassium chloride decreases the viscosity to 5700 centipoises, and 1% potassium chloride decreases the viscosity to 3400 centipoises. If the temperature is reduced to 4.4° C. in the case of this last system the viscosity is increased to 5500 centipoises, but no gelation occurs.

It may be shown similarly that Irish moss extracts alone form only colloidal dispersions at 26° C., in a concentration of 0.6 to 1% gelose, due to the lack of sufficient favorable cations for gelation. Viscosity of a 0.6% dispersion of commercial extract will be about 90 centipoises at pH 6.5 at 26° C. Viscosity will increase to 920 centipoises as the temperature is lowered to 4.4° C. Upon standing at this latter temperature of pH 6.5 for a sufficient period of time gel tendencies will be exhibited and a weak gel may form. A 1% dispersion of gelose will have a viscosity of 250 centipoises at pH 6.5 at 26° C. and will form a weak gel at 4.4° C. Increased acidity will decrease the viscosity of this latter dispersion so that it has a viscosity of only 58 centipoises at pH 3.5 at 26° C. and no gel will form at 4.4° C. However, it is known that certain cations, notably potassium, induce gelation. A 0.6% dispersion of Irish moss extract containing 0.2% KCl will form a 40% soluble solids sugar gel with a strength of 12.5 g. per cm.$^2$ at pH 3.5 at 26° C. using a plunger 2.1 cm. in diameter for breaking the gel surface and a 6-ounce tumbler as container. Further increments of potassium chloride up to 1.2% KCl will increase the strength of the 40% soluble solids gels to a maximum at pH 5.6. More than 1.2% potassium chloride will cause a decrease in gel strength. The gelose gel obtained by the addition of potassium chloride is non-elastic, brittle, and easily shattered by the application of excess pressure.

The two-element system composed of 0.4% locust bean gum and 0.6% Irish moss gelose extract in water solution will not gel. It forms only a viscous solution at pH 5.65, having a viscosity of 400 centipoises at 26° C. When acid is added the viscosity is lowered. A system containing 39% cane sugar in addition to the combination of 0.4% locust bean gum and 0.6% Irish moss gelose extract in the absence of sufficient favorable cation will not produce a gel satisfactory for practical usage. At a room temperature of 26° C. a soft gel only, one which has no measurable strength, will form at pH 5.6. Addition of a small increment of acid causes liquification. At 4.5° C. these proportions of gum and moss gelose plus sugar form a gel with a strength of 9 g. per cm.$^2$ at pH 6.1. Increasing the acidity decreased gel strength until at pH 3.7 an unmeasurable gel form was produced. These gels were sticky products which would not support themselves when removed from the container. Upon doubling the proportions of Irish moss gelose and locust bean gum, a 40% soluble solids sugar gel was produced which had a strength of 28 g. per cm.$^2$ at pH 5.5 and a temperature of 26° C. This gel was a very cloudy, sticky product which was difficult to remove from the container, but when removed it partially retained its form. It exhibited 38.2% sag, when sag was measured with a modified form of instrument known as a "Ridgelimeter" described on page 441 of the June 1944 issue of Food Industries, but its sag, while considerable, is not a true measure of elasticity. Its gel-like form seems to hold together as a result of adhesive characteristics rather than as a true gel system. Upon tripling the above proportions of moss extract and gum, a 40% soluble solids product was obtained which had a strength of 56 g. per cm.² at pH 5.4. While a very sticky, rough-surfaced product, and one which was difficult to remove from the glass at 26° C., this product exhibited a fair degree of form-retention and a sag of 20.6%. It also was an adhesive product rather than a true gel. The eating quality of the product was poor on account of excessive stickiness due to the high proportion of colloidal ingredients. Upon varying the proportion of locust bean gum from 0.4% to 2.0% while holding the percentage of moss extract constant at 0.6%, an increasingly more viscous, gummy, product was obtained, but no gel was produced. Upon varying the proportion of Irish moss gelose extract from 0.6% to 3.0% while holding the percentage of locust bean gum extract constant at 0.4%, the product, while in the container, showed increasing resistance to the plunger of the gel-strength apparatus, but, when removed from their containers, the products were gummy, sticky, shapeless masses.

Only when all three elements, a seaplant gelose, a heat-resistant high polymer, and a favorable cation, coexist in one system do we have the preferred results of the present invention. When the three elements are present, high viscosities are found at all temperatures above that of gelation due to the presence of the highly viscous locust bean gum. Viscosities increase much more rapidly as the temperature of gelation is approached with this novel composition than when only gelose and electrolyte are present. Probably as a result of the high viscosity gel-formation from the liquid state is gradual and not abrupt as is the case when only gelose and electrolyte are used. The most logical explanation for slower gelation appears to be that the highly viscous locust bean gum slows down the normal colloidal movement of the Irish moss extract due to the presence of less free water at higher than normal temperatures and allows a gradual combination of potassium ion with the negatively charged Irish moss gelose. This gradual transition from sol to gel allows a fibrillar structure to be built up which occludes or interlaces locust bean gum fibrils in such a fashion as to give resiliency to the gel. The net result of this slow transition probably accounts for the unexpected and high degree of elasticity in the resulting gels. The strength of the gels formed in this manner are also substantially greater than would be expected or could be predicted from the performance of the elements acting independently of each other or in pairs as two-element systems, for instance, gum-moss gelose, moss gelose-electrolyte, or gum-electrolyte. By binding part of the water of the dispersing medium the gum practically eliminates the free or unbound water phase characteristic of moss gels and thus gives not only a much stronger and more rigid structure, but one, while having a moist surface, with little or no tendency toward "bleeding" or syneresis upon subsequent cooling and contraction of the gel fibrils.

The unusual elasticity which is exhibited by the gels formed in the three-element system is demonstrated in the accompanying figures of the drawing wherein Figure 1 shows two 40% soluble solids sugar gels each having a gel-strength of 54 g. per cm.² of plunger surface.

Gel No. 1 in Figure 1 is representative of the innovatory preferred three-element system. It contained 0.6% Irish moss extract, 0.4% locust bean gum, 0.4% potassium chloride, 0.2% sodium citrate, and 0.2% citric acid in addition to the water and sugar. The sodium citrate and citric acid are present in order to obtain the desired acidity.

Gel No. 2 of Figure 1 is representative of the ordinary Irish moss extract gel as known to the art. It contained 1.0% moss extract, 1.2% potassium chloride, 0.2% sodium citrate, 0.2% citric acid in addition to the water and sugar.

Both gels were made according to identical procedures:

Initial volumes were equal, they were evaporated by boiling for the same time to the same weight, they were poured, cooled, and allowed to set at 26° C. for 24 hours before measurement.

Figure 2 of the drawing further illustrates the difference in elasticity of the two gels. When 20-gram weights of identical dimensions were placed on the tops of these gels, the surface of gel No. 1 in contact with the weight was depressed. The drawing shows that only about ⅔ of the weight was visible when viewed from the side, while the surface of gel No. 2 was depressed to a negligible degree and practically all of the weight was visible. Thus it is demonstrated that whereas the breaking strength of the two gels was the same, the sag, which is an indication of the inherent elasticity was much greater when all three essential elements, moss gelose, gum, potassium ion were present than when only two were employed.

The elasticity of a true gel system of gels formed from the new composition may be varied by modifying the proportion of locust bean gum. Without the gum the sag of a 40% soluble solids gel at pH 4 containing 1% moss and 0.2% KCl amounted to about 2% and the breaking strength of 40 g. per cm.². With 10% gum in the new composition, when the novel three-element system comprised 1.2% of the total weight of gel, the sag was increased to 8%; with 20% gum the sag amounted to about 13%, and with 30% gum the sag increased to about 19%. Probably about 25% to 35% gum will be preferred for most uses. The sag can be increased, of course, for instance upon having 50% gum in the three-element system the sag will be increased to over 30%.

The gels formed in the three-element system do not exhibit the fragility and the brittleness characteristics of the Irish moss gel. Instead they are strongly resilient and form-retaining without being tough. These qualities have been heretofore found principally in fruit pectinate gels. Whereas gel No. 1 in Figures 1 and 2, as an example of the product made with the new composition, was easily removed from its container, gel No. 2 was difficult to remove and its surface was easily ruptured or disfigured; the figures show gel No. 2 to exhibit such a rupture on the lower right-hand side as viewed in Figure 2. The new gelling composition of this invention produces gelose gels which are sufficiently rigid to permit of their being cut from precast slabs and handled with a moderate degree of severity without excessive breakage.

The gels prepared with the gelling composition of this invention are heat reversible, i. e. they may be reliquified by heating and subsequently regelled on cooling. The importance of this property will be best understood in connection with the problem of manufacturer's trimmings or "scrap." This material, when made from the new composition, merely needs to be remelted and recast, thereby avoiding waste.

The new gels made from the composition embodying this invention may be prepared with water alone or with water in combination with sugars or glycols in low as well as high concentrations. Sugar gels may be made with any desired content of sugar or sugars from 0% up to the saturation point of the dominant crystallizable sugar in the mixture. The percentage of the new composition, gelose-viscous polymercation which must be present in a gel in order to provide a uniform breaking strength, 40 g. per cm.² when using a plunger 2.1 cm. in diameter and a standard 6-ounce jelly glass, and a uniform elasticity, about 18% to 20% sag, varies with the soluble solids content of the gel, thus at pH 4 the following approximate amounts are required:

*Percent composition required for various soluble solid jellies*

5% soluble solids—1.68% composition
20% soluble solids—1.50% composition
40% soluble solids—1.24% composition
60% soluble solids—0.98% composition All of the sugar gel products have excellent eating qualities.

The gelling composition of this invention operates over a broad pH range which takes in the normal acidity range of many non-acid and mildly-acid fruit and vegetable raw materials. The preferred range is from pH 3.5 to pH 7.0. At the more acid levels, below pH 4, it is desirable to employ the buffering form of the electrolyte referred to earlier in this disclosure, e. g. potassium citrate. At the higher pH levels an inorganic salt, such as potassium chloride, may be used. Gels may be made with the new composition of the pH range 2.0 to 10.

Non-acid and mildly-acid gel products, which may be made with the composition of this invention include: apple, cider and wine gels, peach, pear and plum juice gels, banana, cocoanut, sweet potato, mint, spiced gels, and a variety of aspics.

In the practical embodiment of the present invention the following proportions of the several materials by weight are employed and blended in a suitable grinder or mixing machine to provide a dry gelling composition of uniform appearance and composition; purified whole dried extract of Irish moss 12 parts, locust bean gum 8 parts, and potassium chloride 5 parts. This is our basic dry gelling composition to which sugars and other substances may be added.

Another example is purified whole dried extract of Irish moss 9 parts, locust bean gum 6 parts, potassium citrate 5 parts.

A typical gel mix incorporating the edible gel composition of this invention, containing 50% Irish moss extract, 33⅓% locust bean gum, and 16⅔% potassium chloride is:

| | Pounds |
|---|---|
| Gelling composition | 1.0 |
| Sugar | 22.0 |
| Prune juice (18% soluble solids) | 70.0 |

The sugar and gel composition are mixed dry and when ready to prepare the gel the 70 pounds of prune juice are added slowly with stirring and boiled at 216° F. Such mixture is then poured into molds and this makes a gel of approximately 40% solids content, allowing for evaporation of water during cooking. The amount of soluble solids in the gel may be varied at will by changing the amount of added sugar and final boiling temperature.

The net result of the several coacting substances herein described is to produce gels of which Irish moss gelose is the major colloid ingredient, which are much more elastic and stronger than any moss-gelose gels heretofore produced, these improvements being accomplished at a considerable saving of colloid materials since less of the gelling agent is needed to produce a gel of the required rigidity.

The permissible ranges of amounts of ingredients by weight which may comprise the novel composition are Irish moss extract 40 to 60%, locust bean gum 20 to 40%, and potassium chloride 15 to 30%.

I claim:

1. A composition containing in approximate proportion by weight of Irish moss extract 50%, locust bean gum 33⅓% and potassium chloride 16⅔%, said composition being capable of forming a strong and elastic gel solely by applying water and heat thereto sufficient to dissolve and disperse the ingredients and then cooling the same to gelling temperature, the gel product having strength and elasticity of greater magnitude than can be accounted for by the additive effects of the locust bean gum and the potassium chloride on the Irish moss extract.

2. The composition set forth in claim 1, in the form of a dry powder.

3. An edible gel made from a composition containing Irish moss extract, locust bean gum and an edible water-soluble salt of the group consisting of potassium acetate, potassium citrate, potassium chloride, and potassium acid tartrate which imparts strength and elasticity to the gel of greater magnitude than can be accounted for by the additive effects of the locust bean gum and the salt components acting independently of each other on the Irish moss extract.

4. The gel presented in claim 3 characterized by a relatively low melting point and ability to reset upon cooling.

GEORGE L. BAKER.

REFERENCES CITED

The following references are of record in the file of this patent:

UNITED STATES PATENTS

| Number | Name | Date |
|---|---|---|
| 1,946,649 | Thomas et al. | Feb. 13, 1934 |
| 2,427,594 | Frieden et al. | Sept. 16, 1947 |